United States Patent
Park et al.

(10) Patent No.: US 8,487,863 B2
(45) Date of Patent: Jul. 16, 2013

(54) STEREOSCOPIC IMAGE DISPLAY AND METHOD FOR DRIVING THE SAME

(75) Inventors: Joonyoung Park, Gyeonggi-do (KR); Euitae Kim, Gyeonggi-do (KR); Taeuk Kang, Gyeonggi-do (KR); Jaewoo Park, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 462 days.

(21) Appl. No.: 12/894,969

(22) Filed: Sep. 30, 2010

(65) Prior Publication Data

US 2011/0273480 A1    Nov. 10, 2011

(30) Foreign Application Priority Data

May 6, 2010   (KR) .................. 10-2010-0042518

(51) Int. Cl.
   *G09G 3/36*   (2006.01)
(52) U.S. Cl.
   USPC ........................ 345/102; 348/51; 362/97.1
(58) Field of Classification Search
   USPC ............... 345/102; 353/7; 348/51; 313/498; 362/97.1–97.3; 349/69, 70
   See application file for complete search history.

(56) References Cited

U.S. PATENT DOCUMENTS

| 5,821,989 | A | 10/1998 | Lazzaro et al. |
| 6,023,277 | A * | 2/2000 | Osaka et al. .................. 345/419 |
| 8,004,622 | B2 * | 8/2011 | Schultz et al. ................. 349/15 |
| 2006/0192746 | A1 * | 8/2006 | Ioki et al. ...................... 345/102 |
| 2007/0022949 | A1 | 2/2007 | Saito |
| 2007/0080905 | A1 * | 4/2007 | Takahara ........................ 345/76 |
| 2009/0009508 | A1 * | 1/2009 | Koo et al. ..................... 345/214 |
| 2011/0089860 | A1 * | 4/2011 | Kuo et al. ..................... 315/294 |
| 2011/0164119 | A1 * | 7/2011 | Jeong ............................. 348/51 |

FOREIGN PATENT DOCUMENTS

| EP | 2312570 A1 * | 4/2011 |
| EP | 2341712 A2 * | 7/2011 |
| KR | 10-2011-0107670 A | 10/2011 |

* cited by examiner

*Primary Examiner* — Tom Sheng
(74) *Attorney, Agent, or Firm* — Morgan, Lewis & Bockius LLP (57) ABSTRACT

A stereoscopic image display and a method for driving the same are disclosed. The stereoscopic image display includes a display panel that displays a two-dimensional (2D) image data in a 2D mode and display a three-dimensional (3D) image data in a 3D mode, a backlight unit providing light to the display panel, a backlight controller that reduces a duty ratio of the backlight unit in a 3D mode lower than a duty ratio set in the 2D mode, and increases a forward current supplied to light sources of the backlight unit in the 3D mode greater than a forward current set in the 2D mode, and a light source driver driving the light sources of the backlight unit.

8 Claims, 10 Drawing Sheets

FIG. 1

(RELATED ART)

FIG. 2

(RELATED ART)

STEREOSCOPIC IMAGE DISPLAY AND METHOD FOR DRIVING THE SAME

This application claims the benefit of Korea Patent Application No. 10-2010-0042518 on May 6, 2010, the entire contents of which is incorporated herein by reference for all purposes as if fully set forth herein.

BACKGROUND OF THE INVENTION

1. Field of the Invention

Exemplary embodiments of the invention relate to a stereoscopic image display and a method for driving the same.

2. Discussion of the Related Art

A stereoscopic image display is divided into a display using a stereoscopic technique and a display using an autostereoscopic technique.

The stereoscopic technique, which uses a parallax image between left and right eyes of a user with a high stereoscopic effect, includes a glasses type method and a non-glasses type method. In the glasses type method, the parallax image between the left and right eyes is displayed on a direct-view display or a projector through a change in a polarization direction of the left and right parallax image or in a time-division manner, and thus a stereoscopic image is implemented using polarization glasses or shutter glasses. In the non-glasses type method, an optical axis of the parallax image between the left and right eyes is separated generally using an optical plate such as a parallax barrier and a lenticular lens, and thus the stereoscopic image is implemented.

U.S. Pat. No. 5,821,989 and U.S. Publication No. 2007022949A1 are known to disclose an example of the glasses type stereoscopic image display.

Figure 1:
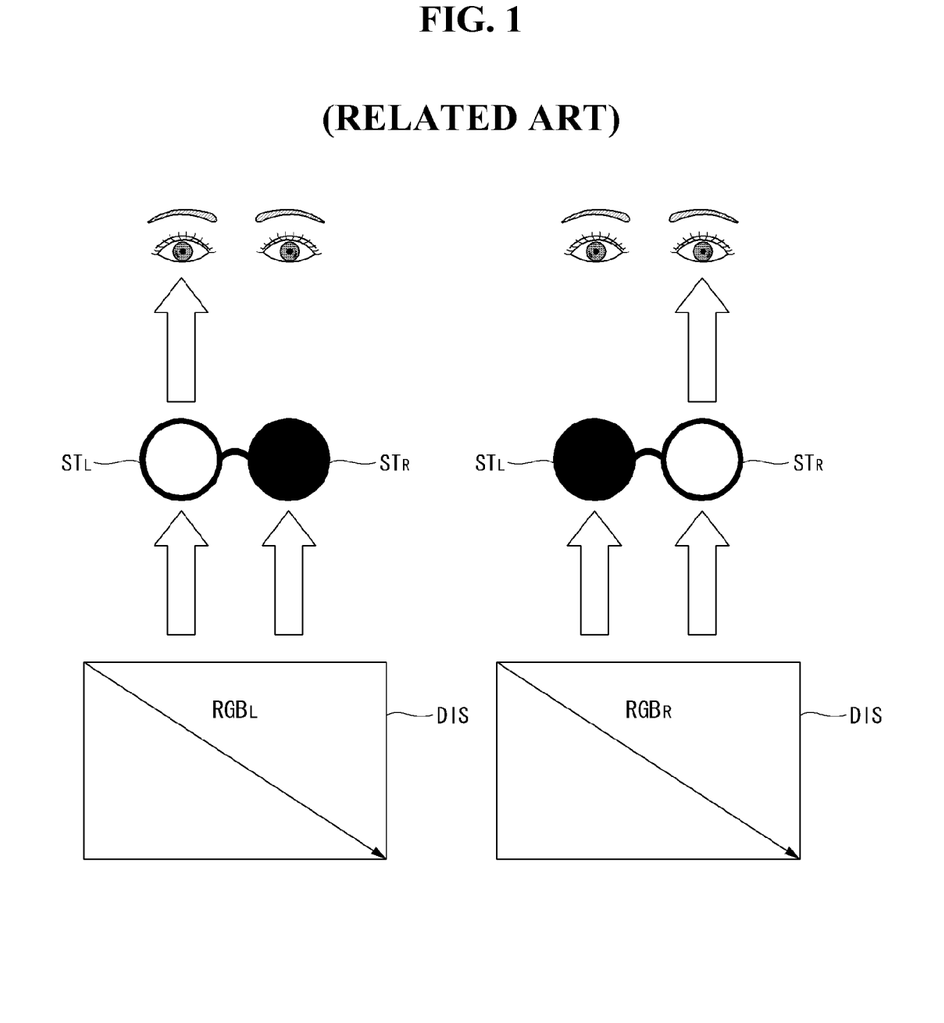
FIG. 1 illustrates a time-division operation of left and right images in a glasses type stereoscopic image display.

FIG. 1 schematically illustrates a glasses type stereoscopic image display. In FIG. 1, a black region of shutter glasses ST represents a shutter that blocks light traveling toward an observer (i.e., viewer), and a white region of the shutter glasses ST represents a shutter allowing transmission of light toward the observer. When a liquid crystal display element is selected as a display element DIS, a backlight unit providing light to the display element DIS is necessary.

As shown in FIG. 1, during odd-numbered frame periods, left eye image data $RGB_L$ is written to the display element DIS, and a left eye shutter $ST_L$ of the shutter glasses ST is open. During even-numbered frame periods, right eye image data $RGB_R$ is written to the display element DIS, and a right eye shutter $ST_R$ of the shutter glasses ST is open. Thus, the observer can view only a left eye image during the odd-numbered frame periods and only a right eye image during the even-numbered periods, thereby obtaining a stereoscopic feeling.

Figure 2:
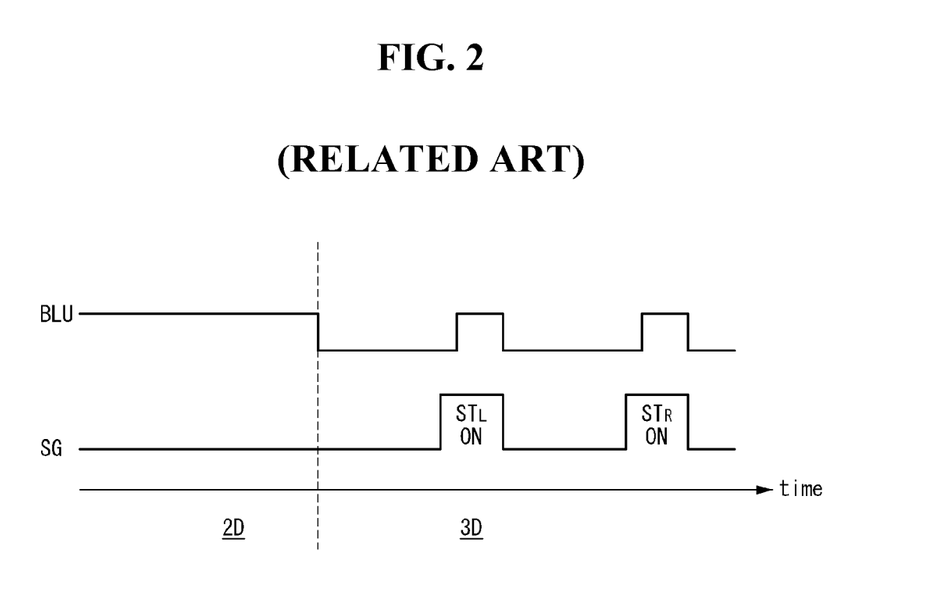
FIG. 2 is a waveform diagram illustrating an example where a turn-on rate of a backlight unit of a liquid crystal display decreases in a three-dimensional (3D) mode.

The display element DIS may display a two-dimensional image (hereinafter to as "2D image") in a 2D mode and may display a three-dimensional image (hereinafter to as "3D image") in a 3D mode. A vertical blank time, in which there is no data, increases in the 3D mode, so as to reduce 3D crosstalk, in which the observer may view an overlapping image of the left eye image and the right eye image. Alternatively, as shown in FIG. 2, there is a method for reducing a backlight turn-on rate of a liquid crystal display. The backlight turn-on rate indicates a rate of a turn-on time of the backlight unit BLU with respect to a fixed time. The backlight turn-on rate may be controlled by a pulse width modulation (PWM) signal capable of turning on and off light sources of the backlight unit BLU.

FIG. 2 illustrates a turn-on rate of the backlight unit BLU in the 2D and 3D modes.

As shown in FIG. 2, the light sources of the backlight unit BLU are turned on in a duty ratio of 100% in the 2D mode and are turned on in a duty ratio less than the 2D mode in the 3D mode. The backlight unit BLU is turned on for an open time of each of the left eye shutter $ST_L$ and the right eye shutter $ST_R$ of the shutter glasses ST. In the 3D mode, the left eye shutter $ST_L$ of the shutter glasses ST is open when the left eye image is displayed on the display element DIS, and the right eye shutter $ST_R$ of the shutter glasses ST is open when the right eye image is displayed on the display element DIS. However, because the backlight unit BLU is turned on in the low duty ratio in the 3D mode, the user feels that a luminance of the stereoscopic image display in the 3D mode is less than the 2D mode.

SUMMARY OF THE INVENTION

Exemplary embodiments of the invention provide a stereoscopic image display and a method for driving the same capable of increasing a luminance level of light sources in a three-dimensional (3D) mode to a level similar to a two-dimensional (2D) mode.

In one aspect, there is a stereoscopic image display comprising a display panel configured to display a two-dimensional (2D) image data in a 2D mode and display a three-dimensional (3D) image data in a 3D mode, a backlight unit configured to provide light to the display panel, a backlight controller configured to generate backlight control data that reduces a duty ratio of the backlight unit in the 3D mode lower than a duty ratio set in the 2D mode and increases a forward current supplied to light sources of the backlight unit in the 3D mode greater than a forward current set in the 2D mode, and a light source driver configured to drive the light sources of the backlight unit in response to the backlight control data.

In another aspect, there is a method for driving a stereoscopic image display comprising displaying a two-dimensional (2D) image data on a display panel in a 2D mode and displaying a three-dimensional (3D) image data on the display panel in a 3D mode, providing light to the display panel using a backlight unit, and reducing a duty ratio of the backlight unit lower than a duty ratio set in the 2D mode, and increasing a forward current supplied to light sources of the backlight unit in the 3D mode greater than a forward current set in the 2D mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Names of elements used in the following description are selected in consideration of facility of specification preparation. Thus, the names of the elements may be different from names of elements used in a real product.

Reference will now be made in detail embodiments of the invention examples of which are illustrated in the accompanying drawings.

Figure 3:
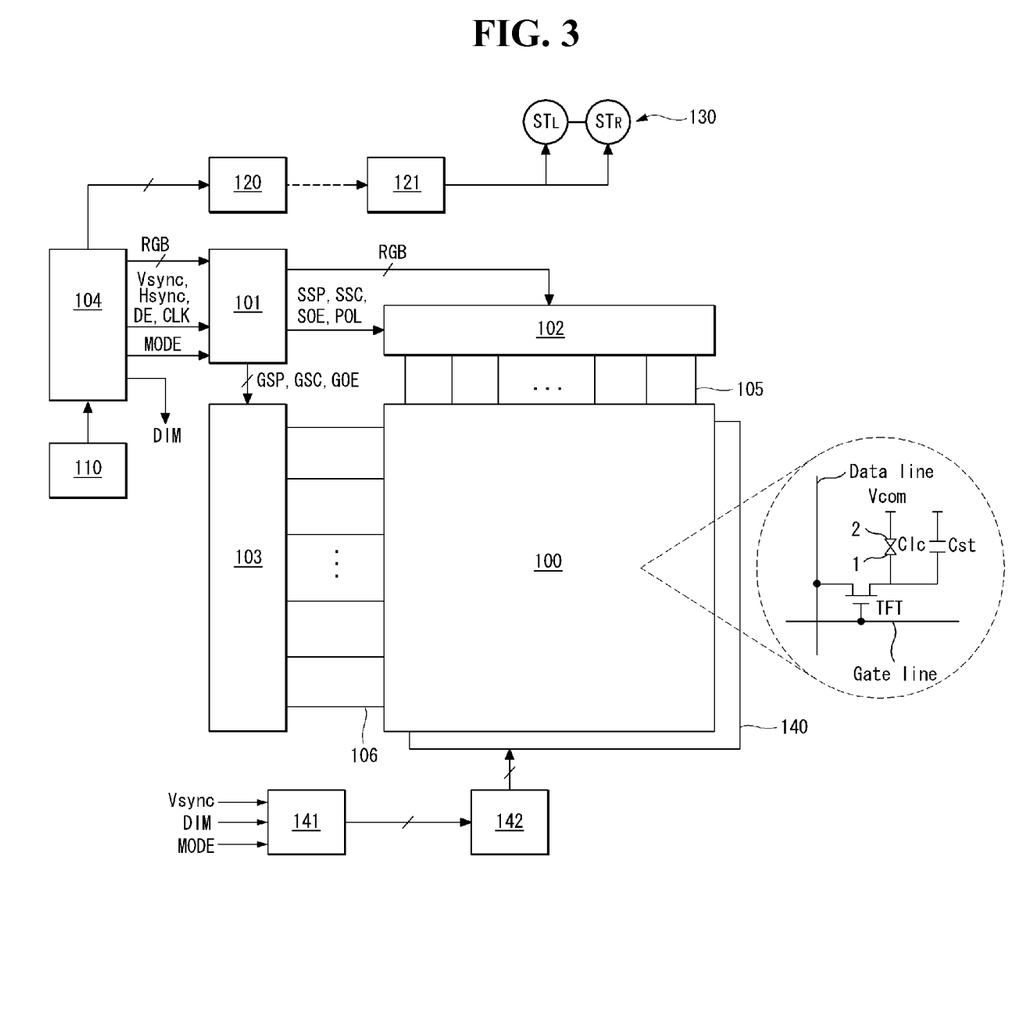
FIG. 3 is a block diagram of a stereoscopic image display according to an exemplary embodiment of the invention.

As shown in FIG. 3, a stereoscopic image display according to an exemplary embodiment of the invention includes a display panel 100, a backlight unit 140, a timing controller 101, a data driving circuit 102, a gate driving circuit 103, a backlight controller 141, a light source driver 142, a system board 104, and shutter glasses 130.

The display panel 100 includes an upper glass substrate, a lower glass substrate, and a liquid crystal layer between the upper and lower glass substrates. The display panel 100 includes liquid crystal cells arranged in a matrix form based on a crossing structure of data lines 105 and gate lines 106.

The data lines 105, the gate lines 106, thin film transistors (TFTs), storage capacitors, etc. are formed on the lower glass substrate of the display panel 100. The liquid crystal cells of the display panel 100 are driven by an electric field between a pixel electrode connected to the TFT and a common electrode receiving a common voltage. A black matrix, a color filter, the common electrode, etc, are formed on the upper glass substrate of the display panel 100. Polarizing plates are respectively attached to the upper and lower glass substrates of the display panel 100. Alignment layers for setting a pre-tilt angle of liquid crystals are respectively formed on the upper and lower glass substrates. In a vertical electric field driving manner such as a twisted nematic (TN) mode and a vertical alignment (VA) mode, the common electrode is formed on the upper glass substrate. In a horizontal electric field driving manner such as an in-plane switching (IPS) mode and a fringe field switching (FFS) mode, the common electrode is formed on the lower glass substrate along with the pixel electrode.

The display panel 100 applicable to the exemplary embodiment of the invention may be implemented in any liquid crystal mode as well as the TN, VA, IPS, and FFS modes.

The backlight unit 140 may be implemented as one of an edge type backlight unit and a direct type backlight unit. In the edge type backlight unit, a plurality of light sources are positioned opposite the side of a light guide plate (not shown), and a plurality of optical sheets are positioned between the display panel 100 and the light guide plate. In the direct type backlight unit, a plurality of optical sheets and a diffusion plate are stacked under the display panel 100, and a plurality of light sources are positioned under the diffusion plate. The light sources may be implemented as at least one of a cold cathode fluorescent lamp (CCFL), an external electrode fluorescent lamp (EEFL), and a light emitting diode (LED). The light emitting diode may be preferably used because a luminance of the light emitting diode may be easily controlled through an adjustment of a forward current IF.

The timing controller 101 supplies a digital video data RGB received from the system board 104 to the data driving circuit 102. The timing controller 101 receives a timing signal, such as a vertical sync signal Vsync, a horizontal sync signal Hsync, a data enable DE, and a dot clock CLK, from the system board 104. The timing controller 101 then generates control signals for controlling an operation timing of each of the data driving circuit 102 and the gate driving circuit 103. The control signals include a gate timing control signal for controlling the operation timing of the gate driving circuit 103 and a data timing control signal for controlling the operation timing of the data driving circuit 102 and a polarity of a data voltage.

The timing controller 101 may switch between operations of a two-dimensional (2D) mode and a three-dimensional (3D) mode based on a mode signal MODE received from the system board 104 or a mode identification code coded to an input image signal. The timing controller 101 or the system board 104 may multiply an input frame frequency of 60 Hz by 'i' to thereby drive the display panel 100 at a frame frequency of (60×i) Hz, where N is a positive integer equal to or greater than 2. The input frame frequency is 50 Hz in a phase alternate line (PAL) manner and is 60 Hz in a national television standards committee (NTSC) manner. When the input frame frequency is multiplied by 4 and is 200 Hz in the PAL manner, one frame period is approximately 5 msec. When the input frame frequency is multiplied by 4 and is 240 Hz in the NTSC manner, one frame period is approximately 4.16 msec.

The gate timing control signal includes a gate start pulse GSP, a gate shift clock GSC, a gate output enable GOE, and the like. The gate start pulse GSP is applied to a first gate driver integrated circuit (IC) to generate a first gate pulse and controls the first gate driver IC so that the first gate pulse is generated by the first gate driver IC. The gate shift clock GSC is a clock commonly input to a plurality of gate driver ICs of the gate driving circuit 103 and also is a clock for shifting the gate start pulse GSP. The gate output enable GOE controls outputs of the gate driver ICs.

The data timing control signal includes a source start pulse SSP, a source sampling clock SSC, a polarity control signal POL, a source output enable SOE, and the like. The source start pulse SSP controls a data sampling start time of the data driving circuit 102. The source sampling clock SSC controls a sampling time of data inside the data driving circuit 102 based on a rising or falling edge. The polarity control signal POL controls a polarity of the data voltage output from the data driving circuit 102. The source output enable SOE controls an output time of the data driving circuit 102. If the digital video data RGB to be input to the data driving circuit 102 is transferred based on a mini low voltage differential signaling (LVDS) interface standard, the source start pulse SSP and the source sampling clock SSC may be omitted.

The data driving circuit 102 includes a plurality of source driver ICs. Each of the source driver ICs includes a shift register, a latch, a digital-to-analog converter (DAC), an output buffer, and the like. The data driving circuit 102 latches the digital video data RGB under the control of the timing controller 101. The data driving circuit 102 converts the latched digital video data RGB into positive and negative analog gamma compensation voltages and inverts the polarity of the data voltage in response to the polarity control signal POL. The data driving circuit 102 inverts the polarities of the data voltages output to the data lines 105 in response to the polarity control signal POL.

The gate driving circuit 103 sequentially supplies a gate pulse to the gate lines 106 in response to the gate timing control signals.

The backlight controller 141 may distinguish between the 2D mode and the 3D mode in response to the mode signal MODE received from the system board 104 or the timing controller 101. The backlight controller 141 transmits backlight control data, that includes a control value of a duty ratio of a pulse width modulation (PWM) signal controlled based on a global or local dimming signal DIM received from the system board 104 or the timing controller 101, to the light source driver 142 in a serial peripheral interface (SPI) data format, so that a backlight luminance is controlled in response to the global/local dimming signal DIM. The backlight controller 141 allows the duty ratio of the PWM signal in the 3D mode to be less than the 2D mode and reduces a turn-on rate of the light sources in the 3D mode. The backlight controller 141 generates the backlight control data, that controls a rising time and a falling time of the PWM signal determining a turn-on time and a turn-off time of the light sources based on the vertical sync signal, in the 3D mode in the SPI data format. The backlight controller 141 may be mounted inside the timing controller 101.

The light source driver 142 reduces the PWM duty ratio of the light sources in the 3D mode in response to the backlight control data from the backlight controller 141, thereby allowing the turn-on rate of the light sources in the 3D mode to be less than the 2D mode. The light source driver 142 allows a forward current applied to the light sources in the 3D mode to be greater than the 2D mode. Accordingly, the stereoscopic image display according to the exemplary embodiment of the invention controls the light sources so that the turn-on rate of the light sources in the 3D mode is less than the 2D mode, thereby preventing 3D crosstalk. Further, the stereoscopic image display according to the exemplary embodiment of the invention increases a luminance of the light sources in the 3D mode, thereby keeping a luminance level of the light sources in the 3D mode at a level similar to the 2D mode.

The system board 104 supplies 2D image data or 3D image data and the timing signals Vsync, Hsync, DE and CLK to the timing controller 101 through an interface, such as a low voltage differential signaling (LVDS) interface and a transition minimized differential signaling (TMDS) interface. The system board 104 supplies a 2D image to the timing controller 101 in the 2D mode and supplies a 3D image including a left eye image and a right eye image to the timing controller 101 in the 3D mode. The system board 104 may transmit the 2D image data and the 3D image data at the frame frequency of (60×i) Hz. The system board 104 or the timing controller 101 analyzes the 2D image data or the 3D image data and calculates a global or local diming value capable of increasing contrast characteristics of a display image based on the result of an analysis, thereby generating the global/local dimming signal DIM.

A user may select the 2D mode or the 3D mode using a user input device 110. The user input device 110 includes a touch screen, an on-screen display (OSD), a keyboard, a mouse, a remote controller, etc. that are attached to or mounted inside the display panel 100. The system board 104 may switch between the operation of the 2D mode and the operation of the 3D mode in response to user data input through the user input device 110. The system board 104 may switch between the operation of the 2D mode and the operation of the 3D mode through a 2D or 3D identification code encoded to input image data.

In the 3D mode, the system board 104 outputs a shutter control signal to a shutter control signal transmission unit 120 so as to alternatively open and close a left eye shutter $ST_L$ and a right eye shutter $ST_R$ of the shutter glasses 130. The shutter control signal transmission unit 120 transmits the shutter control signal to a shutter control signal reception unit 121 through a wireline/wireless interface. The shutter control signal reception unit 121 may be mounted inside the shutter glasses 130. Alternatively, the shutter control signal reception unit 121 may be manufactured as a separate module and may be attached to the shutter glasses 130.

The shutter glasses 130 include the left eye shutter $ST_L$ and the right eye shutter $ST_R$ which are separately controlled electrically. Each of the left eye shutter $ST_L$ and the right eye shutter $ST_R$ includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage is supplied to the second transparent electrode. When the ON voltage is supplied to the second transparent electrode of each of the left and right eye shutters $ST_L$ and $ST_R$, each of the left and right eye shutters $ST_L$ and $ST_R$ transmits light from the display panel 100. On the other hand, when the OFF voltage is supplied to the second transparent electrode of each of the left and right eye shutters $ST_L$ and $ST_R$, each of the left and right eye shutters $ST_L$ and $ST_R$ blocks light from the display panel 100.

The shutter control signal reception unit 121 receives the shutter control signal through the wireline/wireless interface. The shutter control signal reception unit 121 alternately opens and closes the left and right eye shutters $ST_L$ and $ST_R$ of the shutter glasses 130 in response to the shutter control signal. When the shutter control signal of a first logic value is input to the shutter control signal reception unit 121, the ON voltage is supplied to the second transparent electrode of the left eye shutter $ST_L$ and the OFF voltage is supplied to the second transparent electrode of the right eye shutter $ST_R$. When the shutter control signal of a second logic value is input to the shutter control signal reception unit 121, the OFF voltage is supplied to the second transparent electrode of the left eye shutter $ST_L$ and the ON voltage is supplied to the second transparent electrode of the right eye shutter $ST_R$. Accordingly, the left eye shutter $ST_L$ of the crystal shutter glasses 130 is open when the shutter control signal of the first logic value is generated, and the right eye shutter $ST_R$ of the shutter glasses 130 is open when the shutter control signal of the second logic value is generated.

Figure 4:
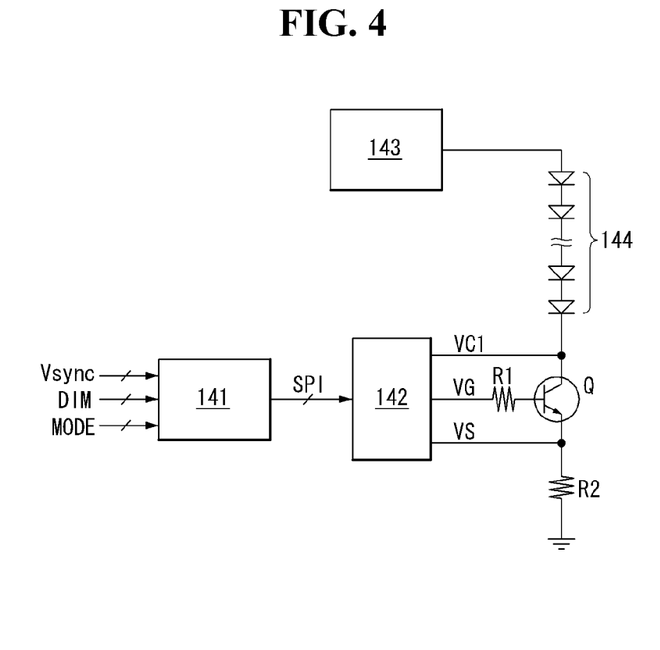
FIG. 4 is a circuit diagram illustrating light sources of a backlight unit shown in FIG. 3 and a circuit configuration for controlling the light sources.
Figure 5:
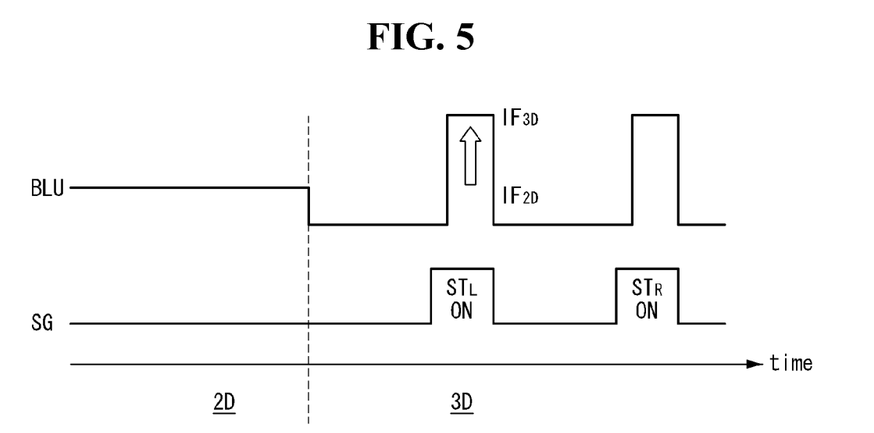
FIG. 5 is a waveform diagram illustrating a method for driving a stereoscopic image display according to a first exemplary embodiment of the invention.
Figure 6:
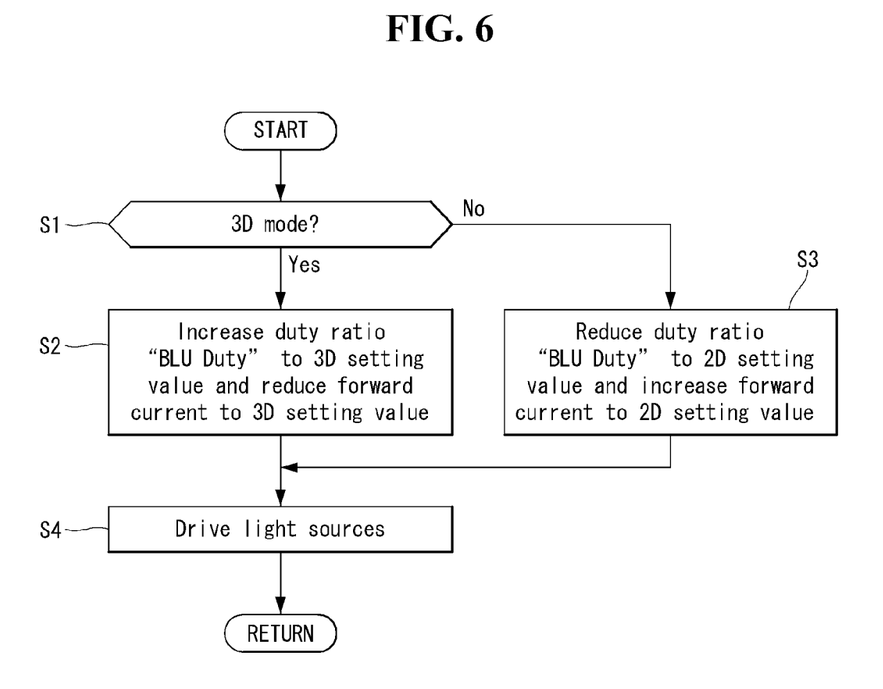
FIG. 6 is a flow chart sequentially illustrating control steps of a backlight controller shown in FIG. 3.

FIG. 4 is a circuit diagram illustrating the light sources of the backlight unit 140 and a circuit configuration for controlling the light sources. More specifically, FIG. 4 illustrates an example where the light sources are implemented as a LED array. FIG. 5 is a waveform diagram illustrating a method for driving a stereoscopic image display according to a first exemplary embodiment of the invention. FIG. 6 is a flow chart sequentially illustrating control steps of the backlight controller 141.

As shown in FIGS. 4 to 6, a buster converter 143 supplies a DC voltage of 100 V to 150 V to an anode terminal of a LED array 144.

A forward current IF of the LED array 144 is controlled based on a base voltage VG of a transistor Q. The transistor Q is an NPN (or N-channel) transistor. The transistor Q includes a collector terminal (or a drain terminal) connected to a cathode terminal of the LED array 144 and a first output terminal of the light source driver 142, a base terminal (or a gate terminal) connected to a second output terminal of the light source driver 142 through a first resistor R1, and an emitter terminal (or a source terminal) connected to a ground level voltage source GND through a second resistor R2.

The light source driver 142 reduces the duty ratio of the PWM signal output through the second output terminal of the light source driver 142 in response to the backlight control data of the SPI data format received from the backlight controller 141 in the 3D mode lower than the 2D mode. Further, the light source driver 142 increases the base voltage VG in response to the backlight control data in the 3D mode. As a result, a base-emitter current of the transistor Q and the forward current IF of the LED array 144 increase in the 3D mode. Accordingly, as shown in FIG. 5, in the 3D mode, the LED array 144 is repeatedly turned on and off in the low duty ratio and emits light at a high luminance level because of the high forward current IF. In the 3D mode, the LED array 144 is turned on and off in the duty ratio of approximately 1% to 17% and may emit light in the forward current IF between 120 mA and 150 mA.

The light source driver 142 increases the duty ratio of the PWM signal output through the second output terminal of the light source driver 142 in response to the SPI data received from the backlight controller 141 in the 2D mode greater than the 3D mode. Further, the light source driver 142 reduces the base voltage VG in response to the SPI data in the 2D mode. As a result, the base-emitter current of the transistor Q and the forward current IF of the LED array 144 decrease in the 2D mode. Accordingly, as shown in FIG. 5, in the 2D mode, the LED array 144 is turned on in the high duty ratio and emits light at a low luminance level because of the low forward current IF. In the 2D mode, the LED array 144 is turned on in the duty ratio of approximately 50% to 100% greater than the duty ratio in the 3D mode and may emit light in the forward current IF between 50 mA and 60 mA.

The backlight controller 141 receives the dimming signal DIM, the mode signal MODE, and the vertical sync signal Vsync. The backlight controller 141 converts a rising time, a falling time, and a current information of the PWM signal into SPI data and transmits the SPI data to the light source driver 142. As shown in FIG. 6, in the 3D mode, the backlight controller 141 reduces the duty ratio (BLU Duty) of the PWM signal of the backlight unit to a previously set 3D setting value and increases the forward current to the previously set 3D setting value in steps S1 and S2. In the 2D mode, the backlight controller 141 increases the duty ratio (BLU Duty) of the PWM signal of the backlight unit to a previously set 2D setting value and reduces the forward current to the previously set 2D setting value in step steps S1 and S3. Hence, the light sources of the backlight unit are driven in step S4.

The backlight controller 141 controls the falling time of the PWM signal using "Delay Time (falling edge) =VsyncxC" and controls the rising time of the PWM signal using "Delay Time (rising edge)=Delay Time (falling edge)−VsyncxPWM duty on time", where C is a constant between 0 and 1. The constant C and 'PWM duty on time' vary depending on the 2D setting value and the 3D setting value. The constant C may be adjusted in consideration of liquid crystal response delay characteristics of the shutter glasses 130.

According to the above-described backlight control method, as shown in FIG. 5, the LED array 144 emits light in the high duty ratio and the low forward current in the 2D mode and emits light in the low duty ratio and the high forward current in the 3D mode. The PWM signal of the LED array 144 rises later than a time (or a rising time) at which the left eye shutter $ST_L$ and the right eye shutter $ST_R$ start to be open in consideration of the liquid crystal response delay characteristics of the shutter glasses 130. In the 3D mode, the left eye shutter $ST_L$ of the shutter glasses 130 is open when the left eye image is displayed on the display panel 100, and the right eye shutter $ST_R$ of the shutter glasses 130 is open when the right eye image is displayed on the display panel 100.

Figure 7:
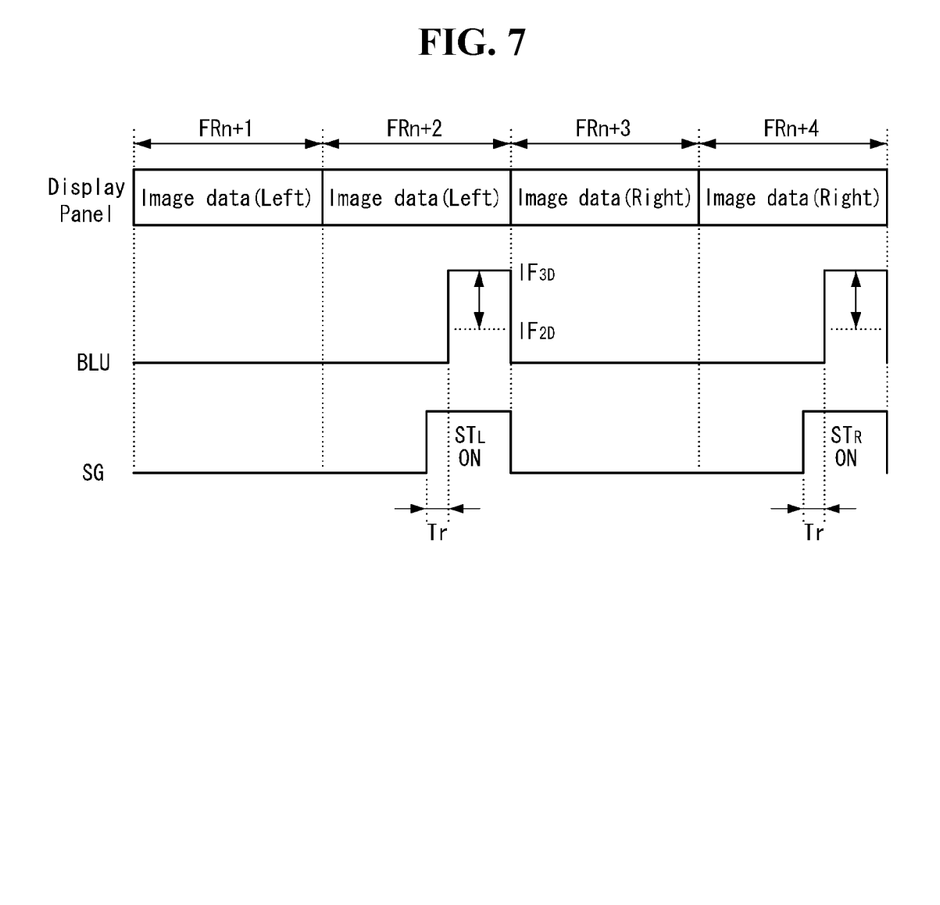
FIG. 7 is a waveform diagram illustrating a method for driving a stereoscopic image display according to a second exemplary embodiment of the invention.

FIG. 7 is a waveform diagram illustrating a method for driving a stereoscopic image display according to a second exemplary embodiment of the invention.

As shown in FIG. 7, in the 3D mode, the data driving circuit 102 converts the left eye image data received from the timing controller 101 into a gamma compensation voltage and outputs the gamma compensation voltage to the data lines 105 during (n+1)th and (n+2)th frame periods Fn+1 and Fn+2. In the 3D mode, the data driving circuit 102 converts the right eye image data received from the timing controller 101 into the gamma compensation voltage and outputs the gamma compensation voltage to the data lines 105 during (n+3)th and (n+4)th frame periods Fn+3 and Fn+4. Accordingly, the same left eye image data is continuously addressed to the liquid crystal cells of the display panel 100 during the (n+1)th and (n+2)th frame periods Fn+1 and Fn+2, and the same right eye image data is continuously addressed to the liquid crystal cells of the display panel 100 during the (n+3)th and (n+4)th frame periods Fn+3 and Fn+4.

Figure 9:
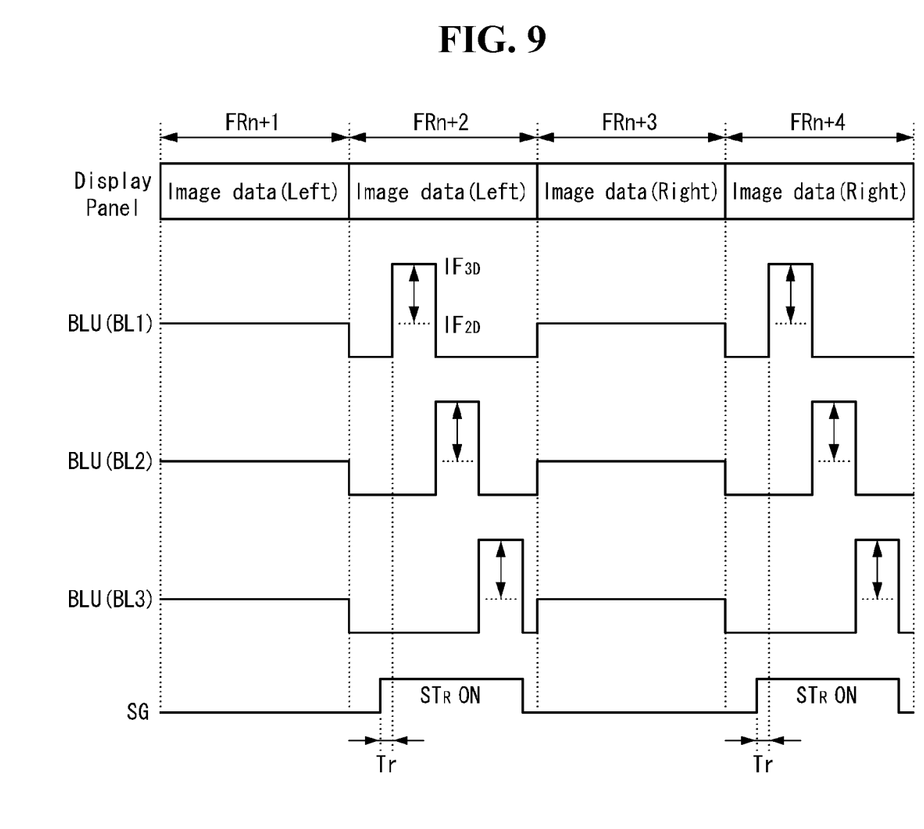
FIG. 9 is a waveform diagram illustrating a method for driving the stereoscopic image display according to the third exemplary embodiment of the invention.

In the 3D mode, the light sources of the backlight unit 140 are turned on during the (n+2)th and (n+4)th frame periods Fn+2 and Fn+4 and are turned on from a predetermined time, that has passed from a start time of one frame period, in a duty ratio of the 3D setting value in consideration of a liquid crystal response delay time of the display pane 100. In the 3D mode, the light sources of the backlight unit 140 are turned on in the duty ratio less than the 2D mode and emit light in a forward current $IF_{3D}$ greater than the 2D mode during the (n+2)th and (n+4)th frame periods Fn+2 and Fn+4. As shown in FIG. 7, in the 3D mode, the light sources of the backlight unit 140 is maintained in a turn-off state during the (n+1)th and (n+3)th frame periods Fn+1 and Fn+3. Alternatively, as shown in FIG. 9, in the 3D mode, the light sources of the backlight unit 140 may emit light in the same forward current $IF_{2D}$ as the 2D mode during the (n+1)th and (n+3)th frame periods Fn+1 and Fn+3. In the 2D mode, the light sources of the backlight unit 140 are turned on in the duty ratio greater than the 3D mode and emit light in the forward current $IF_{2D}$ less than the 3D mode during the (n+1)th to (n+4)th frame periods Fn+1 to Fn+4.

The left eye shutter $ST_L$ of the shutter glasses 130 is open after the liquid crystal response delay time of the display panel 100 passed during the (n+2)th frame period Fn+2. The right eye shutter $ST_R$ of the shutter glasses 130 is open after the liquid crystal response delay time of the display panel 100 passed during the (n+4)th frame period Fn+4. Hence, the 3D crosstalk is prevented.

It is preferable that the light sources of the backlight unit 140 are in a turned-off state for a rising or falling liquid crystal response delay time of the shutter glasses 130 and are turned on after the liquid crystals of the shutter glasses 130 completely respond. For this, the light sources of the backlight unit 140 has to start to be turned on from after a rising liquid crystal response delay time Tr of the shutter glasses 130 passed, and has to be turned off before a falling liquid crystal response delay time of the shutter glasses 130.

The display panel 100 sequentially addresses data along a shift direction of the gate pulse. In this case, when all of the light sources of the backlight unit 140 simultaneously emit light, the luminance is nonuniform depending on a location of the display panel 100. A third exemplary embodiment of the invention divides the light emitting surface of the backlight unit 140 into a plurality of blocks and sequentially turns on the blocks along a scanning direction of the display panel 100 in consideration of the non-uniformity of the luminance.

Figure 8:
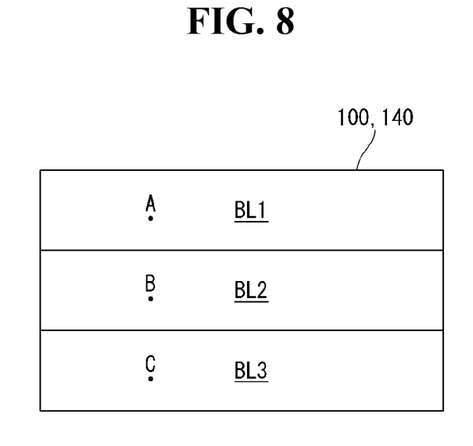
FIG. 8 illustrates an example of a block division of a stereoscopic image display according to a third exemplary embodiment of the invention.
Figure 10:
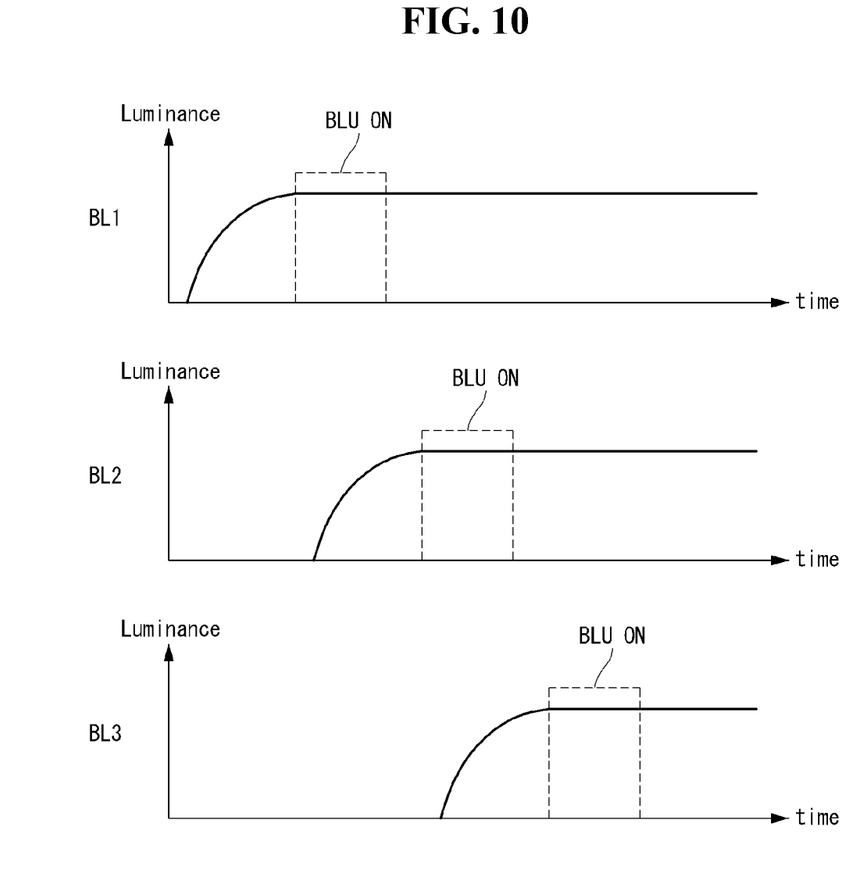
FIG. 10 illustrates a uniformity effect of a luminance obtained by a block division drive illustrated in FIG. 9.

FIG. 8 illustrates an example of a block division of a stereoscopic image display according to the third exemplary embodiment of the invention. FIG. 9 is a waveform diagram illustrating a method for driving the stereoscopic image display according to the third exemplary embodiment of the invention. FIG. 10 illustrates a uniformity effect of a luminance obtained by a block division drive illustrated in FIG. 9.

As shown in FIGS. 8 to 10, a light emitting surface of the backlight unit 140 opposite the display panel 100 is divided into a plurality of blocks BL1 to BL3.

In the 3D mode, the data driving circuit 102 converts the left eye image data received from the timing controller 101 into the gamma compensation voltage and outputs the gamma compensation voltage to the data lines 105 during the (n+1)th and (n+2)th frame periods Fn+1 and Fn+2. In the 3D mode, the data driving circuit 102 converts the right eye image data received from the timing controller 101 into the gamma compensation voltage and outputs the gamma compensation voltage to the data lines 105 during the (n+3)th and (n+4)th frame periods Fn+3 and Fn+4. Accordingly, the same left eye image data is continuously addressed to the liquid crystal cells of the display panel 100 during the (n+1)th and (n+2)th frame periods Fn+1 and Fn+2, and the same right eye image data is continuously addressed to the liquid crystal cells of the display panel 100 during the (n+3)th and (n+4)th frame periods Fn+3 and Fn+4.

In the 3D mode, when all of the light sources of the backlight unit 140 simultaneously emit light in the duty ratio equal to or greater than the 2D mode and the forward current $IF_{2D}$ less than the 2D mode during the (n+1)th frame period Fn+1, all of the blocks BL1 to BL3 are turned on at the low luminance. The light sources of the backlight unit 140 emit light in the low duty ratio of the 3D mode setting value and the high forward current $IF_{3D}$ of the 3D mode setting value during the (n+2)th frame period Fn+2. The blocks BL1 to BL3 each having the light sources of the backlight unit 140 sequentially emit light along a left eye image data scanning direction of the display panel 100 during the (n+2)th frame period Fn+2, and thus the blocks BL1 to BL3 are sequentially turned on in the order named. When all of the light sources of the backlight unit 140 simultaneously emit light in the duty ratio equal to or greater than the 2D mode and the forward current $IF_{2D}$ less than the 2D mode during the (n+3)th frame period Fn+3, all of the blocks BL1 to BL3 are turned on at the low luminance. The light sources of the backlight unit 140 emit light in the low duty ratio of the 3D mode setting value and the high forward current $IF_{3D}$ of the 3D mode setting value during the (n+4)th frame period Fn+4. The blocks BL1 to BL3 each having the light sources of the backlight unit 140 sequentially emit light along a right eye image data scanning direction of the display panel 100 during the (n+4)th frame period Fn+4, and thus the blocks BL1 to BL3 are sequentially turned on in the order named.

A block scanning time (or a turn-on time of each block) of the backlight unit 140 has to be narrowly adjusted so that a light interference between the blocks is minimized When the block scanning time of the backlight unit 140 is reduced and the light sources emit light in the low forward current as described above, the user may feel the luminance reduction of the 3D image. Accordingly, the exemplary embodiment of the invention compensates for the luminance reduction of the 3D image by allowing the light sources to emit light at the low luminance during the (n+1)th and (n+3)th frame periods Fn+1 and Fn+3 and allowing the light sources to emit light in the high forward current $IF_{3D}$ during the (n+2)th and (n+4)th frame periods Fn+2 and Fn+4, thereby keeping the luminance of the 3D image at a level similar to the luminance of the 2D image. As shown in FIG. 7, the light sources may be turned off during the (n+1)th and (n+3)th frame periods Fn+1 and Fn+3.

In the 2D mode, the light sources of the backlight unit 140 are turned on in the duty ratio greater than the 3D mode and emit light in the forward current $IF_{2D}$ less than the 3D mode during the (n+1)th to (n+4)th frame periods Fn+1 to Fn+4.

The left eye shutter $ST_L$ of the shutter glasses 130 is open after the liquid crystal response delay time of the display panel 100 passed during the (n+2)th frame period Fn+2. The right eye shutter $ST_R$ of the shutter glasses 130 is open after the liquid crystal response delay time of the display panel 100 passed during the (n+4)th frame period Fn+4. Hence, the 3D crosstalk is prevented.

It is preferable that the light sources of the backlight unit 140 are in a turned-off state for the rising/falling liquid crystal response delay time of the shutter glasses 130 and are turned on after the liquid crystals of the shutter glasses 130 completely respond. For this, the light sources of the backlight unit 140 start to be turned on from after the rising liquid crystal response delay time Tr of the shutter glasses 130 passed, and are turned off before a falling liquid crystal response delay time of the shutter glasses 130.

A scanning method of the backlight unit 140 illustrated in FIG. 9 sequentially performs a scanning operation along the data scanning direction of the display panel 100. Thus, as shown in FIG. 10, when the response of the liquid crystals reaches a target luminance of a data gray level at all of locations of the display panel 100, the blocks of the backlight unit 140 are turned on. Hence, the luminance uniformity of the 3D image can increase. In FIG. 10, liquid crystal response characteristics of the first block BL1 indicated by a solid line indicate liquid crystal response characteristics of the liquid crystal cells existing in a location "A" in FIG. 8; liquid crystal response characteristics of the second block BL2 indicated by a solid line indicate liquid crystal response characteristics of the liquid crystal cells existing in a location "B" in FIG. 8; and liquid crystal response characteristics of the third block BL3 indicated by a solid line indicate liquid crystal response characteristics of the liquid crystal cells existing in a location "C" in FIG. 8.

As described above, the stereoscopic image display according to the exemplary embodiment of the invention allows the light sources of the backlight unit, that emit light in the low duty ratio, to emit light in the high forward current in the 3D mode, thereby increasing the luminance of the 3D mode to the luminance level of the 2D mode. Furthermore, the stereoscopic image display according to the exemplary embodiment of the invention reduces the duty ratio to reduce the 3D crosstalk and divides the backlight unit into the plurality of blocks to sequentially turn on the blocks of the backlight unit along the data scanning direction of the display panel in the 3D mode. Hence, the luminance uniformity of the 3D image can increase.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a display panel configured to display a two-dimensional (2D) image data in a 2D mode and display a three-dimensional (3D) image data in a 3D mode;
   a backlight unit configured to provide light to the display panel;
   a backlight controller configured to generate backlight control data that reduces a duty ratio of the backlight unit in the 3D mode lower than a duty ratio set in the 2D mode, and increases a forward current supplied to light sources of the backlight unit in the 3D mode greater than a forward current set in the 2D mode; and
   a light source driver configured to drive the light sources of the backlight unit in response to the backlight control data.

2. The stereoscopic image display of claim 1, wherein the light sources of the backlight unit includes a plurality of light emitting diodes emitting light by the forward current.

3. The stereoscopic image display of claim 1, wherein the display panel continuously display left eye image data during (n+1)th and (n+2)th frame periods and continuously display right eye image data during (n+3)th and (n+4)th frame periods in the 3D mode,
   wherein the light sources of the backlight unit emit light in a duty ratio of a 3D setting value less than a duty ratio of a 2D setting value and a forward current of the 3D setting value greater than a forward current of the 2D setting value during the (n+2)th and (n+4)th frame periods in the 3D mode.

4. The stereoscopic image display of claim 3, wherein the light sources of the backlight unit emit light in the duty ratio of the 2D setting value and the forward current of the 2D setting value during the (n+1)th and (n+3)th frame periods in the 3D mode.

5. The stereoscopic image display of claim 3, wherein the light emitting surface of the backlight unit is divided into a plurality of blocks,
   wherein the plurality of blocks are sequentially turned on along a data scanning direction of the display panel during the (n+2)th and (n+4)th frame periods in the 3D mode.

6. The stereoscopic image display of claim 5, wherein the plurality of blocks each having the light sources sequentially emit light in the duty ratio of the 3D setting value and the forward current of the 3D setting value during the (n+2)th and (n+4)th frame periods in the 3D mode.

7. The stereoscopic image display of claim 6, wherein the light sources of the backlight unit simultaneously emit light in the duty ratio of the 2D setting value and the forward current of the 2D setting value during the (n+1)th and (n+3)th frame periods in the 3D mode.

8. A method for driving a stereoscopic image display comprising:
   displaying a two-dimensional (2D) image data on a display panel in a 2D mode and displaying a three-dimensional (3D) image data on the display panel in a 3D mode;
   providing light to the display panel using a backlight unit; and
   reducing a duty ratio of the backlight unit in the 3D mode lower than a duty ratio set in the 2D mode, and increasing a forward current supplied to light sources of the backlight unit in the 3D mode greater than a forward current set in the 2D mode.

* * * * *